United States Patent
Huang (10) Patent No.: US 12,282,446 B2
(45) Date of Patent: Apr. 22, 2025

(54) DETECTION METHOD AND DETECTION DEVICE FOR DETERMINING WHETHER COMMUNICATION PROTOCOL IS UART, I2C BUS, OR SPI

(71) Applicant: Nuvoton Technology Corporation, Hsinchu (TW)

(72) Inventor: Kuo-Chen Huang, Hsinchu (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 70 days.

(21) Appl. No.: 17/825,913

(22) Filed: May 26, 2022

(65) Prior Publication Data

US 2023/0305990 A1    Sep. 28, 2023

(30) Foreign Application Priority Data

Mar. 23, 2022   (TW) .................................. 111110757

(51) Int. Cl.
G06F 13/42 (2006.01)
(52) U.S. Cl.
CPC ...... *G06F 13/4291* (2013.01); *G06F 13/4234* (2013.01); *G06F 2213/0016* (2013.01)

(58) Field of Classification Search
None
See application file for complete search history.

(56) References Cited

U.S. PATENT DOCUMENTS

| 2016/0224489 A1* | 8/2016 | Mishra | G06F 13/364 |
| 2019/0213152 A1* | 7/2019 | Jacobs | G06F 13/385 |

* cited by examiner

*Primary Examiner* — David E Martinez
(74) *Attorney, Agent, or Firm* — MUNCY, GEISSLER, OLDS & LOWE, P.C.

(57) ABSTRACT

A detection method is provided to identify the communication protocol being used between a serial communication interface and an external device. The protocols include URAT, I²C bus, and SPI. The serial communication interface includes a first pin and a second pin. The first pin is shared by the transmission line of UART, the serial clock line of I²C, and the slave-select line of SPI. The second pin is shared by the receive line of UART, the serial data line of I²C, and the clock line of SPI. The detection method includes determining whether the communication protocol is UART, I²C, or SPI based on the signal edges of the first pin and the second pin.

7 Claims, 7 Drawing Sheets

DETECTION METHOD AND DETECTION DEVICE FOR DETERMINING WHETHER COMMUNICATION PROTOCOL IS UART, I2C BUS, OR SPI

CROSS REFERENCE TO RELATED APPLICATIONS

This application claims priority of Taiwan Patent Application No. 111110757, filed on Mar. 23, 2022, the entirety of which is incorporated by reference herein.

BACKGROUND OF THE INVENTION

Field of the Invention

The disclosure is generally related to a detection method and a detection device, and more particularly it is related to a detection method and a detection device for determining whether a communication protocol is UART, I$^2$C bus, or SPI.

Description of the Related Art

Since the transmission interface (e.g., I$^2$C, SPI, or UART) used by a microcontroller (MCU) needs to be determined in advance, the system programming (In-System Programming, ISP) code is able to be burned into LDROM through the transmission interface, and the data is then updated to APROM through the pins of the interface used by the user.

If a microcontroller is able to correspond to various transmission interfaces (e.g., I$^2$C, SPI, and UART), it is necessary to prepare different system programmable codes (ISP code) corresponding to those transmission interfaces. If the pin arrangement of a microcontroller is incorrect, or if the code stored in the LDROM does not match the transmission interface, the APROM may not be updated. In order to avoid situations where the code stored in the LDROM does not match the transmission interface, it is necessary for the microcontroller to be able to identify the communication protocol with the external device by itself.

BRIEF SUMMARY OF THE INVENTION

The present invention provides a detection device and a detection method for identifying the communication protocol of an external device. When a microcontroller can support UART, I$^2$C bus, and SPI at the same time, the detection device and the detection method proposed in the present invention may determine which one of UART, I$^2$C bus, and SPI is the communication protocol being used by the external device. The serial communication interface adjusts the settings with the original update process based on the communication protocol, so that the same program may be utilized to eliminate the need to update a program corresponding to different communication protocols so as to reduce the possibility that the program in the LDROM does not match the serial communication interface.

In an embodiment, a detection method is provided, wherein the detection method is adapted to a serial communication interface to identify the communication protocol between the serial communication interface and an external device. The communication protocols comprise UART, I$^2$C bus, and SPI. The serial communication interface comprises a first pin and a second pin. The transmission line of UART, the serial clock line of I$^2$C bus, and the slave-select line of SPI share the first pin. The receive line of UART, the serial data line of I$^2$C bus, and the clock line of SPI share the second pin. The detection method comprises determining whether the communication protocol is UART, I$^2$C bus, or SPI based on the signal edge of the first pin and the second pin.

According to an embodiment of the invention, the step of determining whether the communication protocol is UART, I$^2$C bus, or SPI based on the signal edge of the first pin and the second pin further comprises determining whether the first pin has the signal edge before the signal of the second pin is toggled. When it is determined that the first pin has the signal edge, it is determined that the communication protocol is SPI.

According to an embodiment of the invention, the step of determining whether the communication protocol is UART, I$^2$C bus, or SPI based on the signal edge of the first pin and the second pin further comprises the following step. When it is determined that the first pin does not have a signal edge, the number of signal edges of the second pin are counted. When the number exceeds a predetermined number, it is determined whether or not the signal of the first pin has been toggled. When the signal of the first pin has been toggled, it is determined that the communication protocol is I$^2$C bus.

According to an embodiment of the invention, the step of determining whether the communication protocol is UART, I$^2$C bus, or SPI based on the signal edge of the first pin and the second pin further comprises the following step. When the number exceeds the predetermined number and the signal of the first pin has not been toggled, it is determined that the communication protocol is UART.

According to an embodiment of the invention, the serial communication interface receives a data signal from the external device through the first pin and/or the second pin, wherein the data signal is 0x55.

According to an embodiment of the invention, the predetermined number is 4.

According to an embodiment of the invention, the detection method further comprises a step of setting the serial communication interface based on the communication protocol that has been identified when the communication protocol is determined to be UART, I$^2$C bus, or SPI.

In an embodiment, a detection device coupled to a serial communication interface and configured to identify the communication protocol between the serial communication interface and an external device is provided. The communication protocol comprises UART, I$^2$C bus, and SPI, and the serial communication interface comprises a first pin and a second pin coupled to the external device. A transmission line of UART, a serial clock line of I$^2$C bus, and a slave-select line of SPI share the first pin. A receive line of UART, a serial data line of I$^2$C bus, and a clock line of SPI share the second pin. The detection device comprises a flip-flop, a comparator, a first multiplexer, a second multiplexer, an adder, and a third multiplexer. The flip-flop stores a first received signal received by the first pin and outputting the first received signal as a first internal signal. The comparator compares the first received signal with the first internal signal to generate a comparison signal. The first multiplexer outputs the comparison signal or a first logic level as a second internal signal according to an edge detection signal. The second multiplexer outputs the first logic level or the second internal signal as a third internal signal according to a state signal. The adder adds 1 to an accumulation signal according to the third internal signal. The third multiplexer outputs the accumulation signal or a second logic level as a determination signal according to the state signal. The serial communication interface determines that the communication protocol is UART, I²C bus, or SPI according to the determination signal.

According to an embodiment of the invention, the detection device further comprises an edge detector. The edge detector is enabled by the state signal and configured to detect a signal edge of the first received signal to generate the edge detection signal.

According to an embodiment of the invention, when the edge detector detects the signal edge of the first received signal, the second internal signal output by the first multiplexer is the first logic level, the second multiplexer outputs the third internal signal that is at the first logic level according to the state signal, and the adder adds 1 to the accumulation signal according to the third internal signal that is at the first logic level.

According to an embodiment of the invention, the detection device further comprises a counter, a fourth multiplexer, and a fifth multiplexer. The counter counts a number of signal edges of a second received signal received by the second pin to generate a count signal. The fourth multiplexer outputs the first logic level or the third logic level as a fourth internal signal, according to the count signal. The fifth multiplexer outputs the second logic level or the fourth internal signal as the state signal, according to the reset signal.

According to an embodiment of the invention, when the counter is reset according to the reset signal, the fourth internal signal output by the fourth multiplexer is at the first logic level, and the state signal output by the fifth multiplexer is at the second logic level. When the edge detector is reset according to the reset signal, the second internal signal output by the first multiplexer is the comparison signal.

According to an embodiment of the invention, when the counter and the edge detector are reset according to the reset signal, the second multiplexer outputs the first logic level as the third internal signal according to the state signal being the second logic level so that an initial value of the accumulation signal is set to 1. The third multiplexer outputs the second logic level as the determination signal according to the state signal.

According to an embodiment of the invention, when the counter begins counting the number, the flip-flop stores the first received signal according to the signal edge of the second received signal and outputs the first received signal as the first internal signal. When the comparator determines that the first received signal and the first internal signal are different, the comparison signal is at the first logic level. The first multiplexer and the second multiplexer provide the comparison signal that is at the first logic level to the adder to increase the accumulation signal by 1.

According to an embodiment of the invention, when the number is not less than a predetermined number, the counting signal generated by the counter is the first logic level, and the fourth multiplexer outputs the fourth internal signal being the third logic level according to the counting signal being the first logic level. The third multiplexer outputs the accumulation signal as the determination signal according to the fourth internal signal being the third logic level.

According to an embodiment of the invention, the predetermined number is 4.

According to an embodiment of the invention, when the determination signal is equal to 1, the serial communication interface determines the communication protocol is UART according to the determination signal. When the determination signal is equal to 2, the serial communication interface determines that the communication protocol is SPI according to the determination signal. When the determination signal exceeds 2, the serial communication interface determines that the communication protocol is I²C bus according to the determination signal.

According to an embodiment of the invention, when the determination signal is equal to 0, the serial communication interface determines that the detection device does not complete the detection according to the determination signal.

According to an embodiment of the invention, the detection device further comprises a register. The register is configured to store the accumulation signal.

According to an embodiment of the invention, the serial communication interface receives a data signal from the external signal through the first pin and/or the second pin, wherein the data signal is 0x55.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It would be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 1:
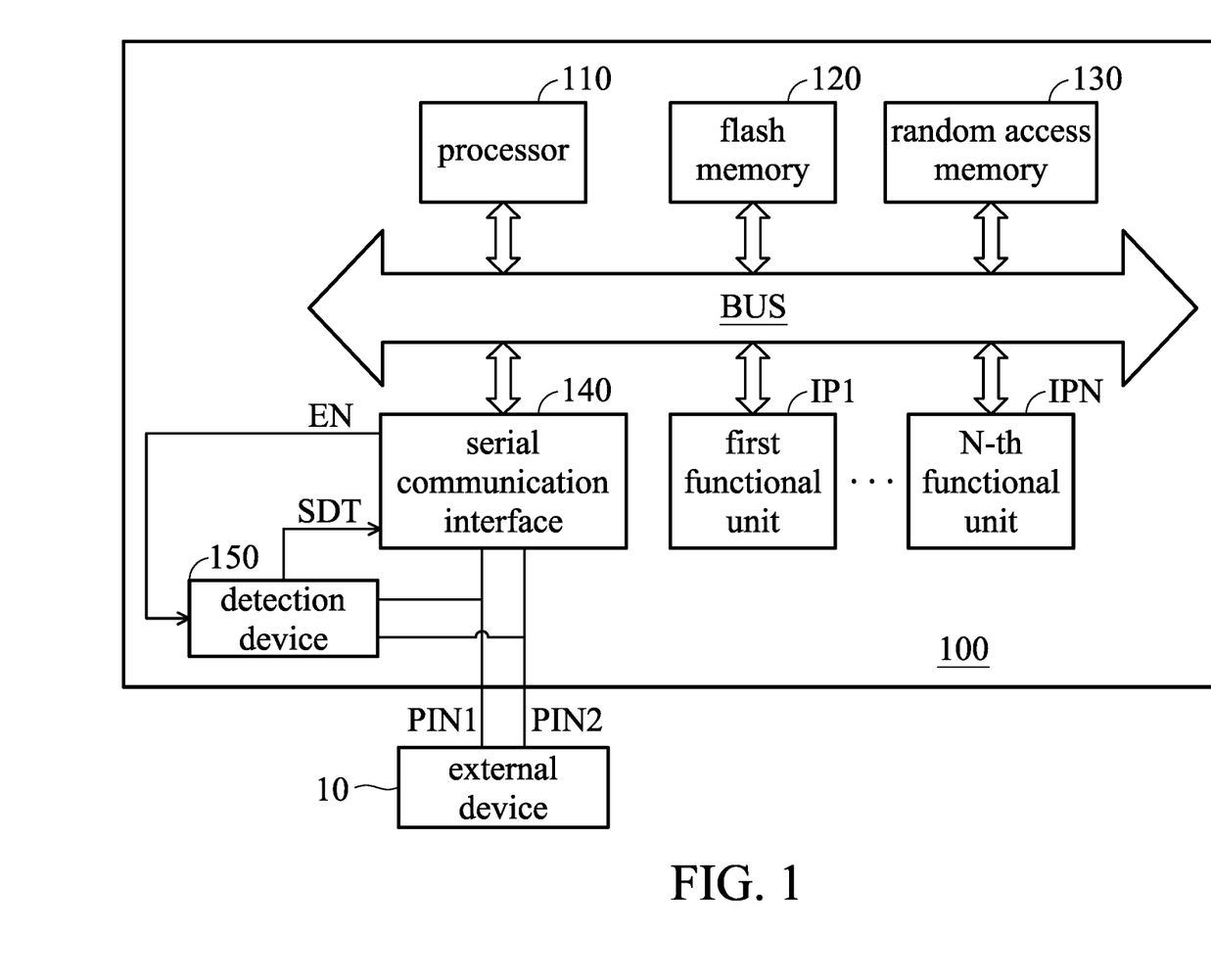
FIG. 1 is a block diagram of a microprocessor in accordance with an embodiment of the present invention.

FIG. 1 shows a block diagram of a microprocessor according to one embodiment of the present invention. As shown in FIG. 1, the microcontroller 100 includes a processor 110, a flash memory 120, a random access memory 130, a serial communication interface 140, a first functional unit IP1, . . . , and an N-th functional unit IPN, in which The processor 110, the flash memory 120, the random access memory 130, the serial communication interface 140, the first functional unit IP1, . . . , and the N-th functional unit IPN communicate with each other through the bus BUS. According to an embodiment of the present invention, the flash memory 120 includes LDROM and APROM. According to some embodiments of the present invention, the first functional unit IP1, . . . , and the N-th functional unit IPN are configured to perform specific functions.

As shown in FIG. 1, the serial communication interface 140 includes a first pin PIN1 and a second pin PIN2. The microcontroller 100 communicates with the external device 10 through the first pin PIN1 and the second pin PIN2 based on a specific communication protocol. According to some embodiments of the present invention, the communication protocols include Universal Asynchronous Receiver/Transmitter (UART), I²C Bus, and Serial Peripheral Interface Bus (SPI).

As shown in FIG. 1, the microcontroller 100 further includes a detection device 150. The serial communication interface 140 enables the detection device 150 by using the enable signal EN, so that the detection device 150 determines the communication protocol used by the external device 10 according to the signals received by the first pin PIN1 and the second pin PIN2. When the detection device 150 determines that the communication protocol is UART, I²C bus, or SPI, the detection device 150 sends a determination signal SDT to notify the serial communication interface 140 to adjust the settings. The following paragraphs will describe in detail how the detection device 150 identifies the communication protocol being used by the external device 10 according to the signals of the first pin PIN1 and the second pin PIN2.

Figure 2:
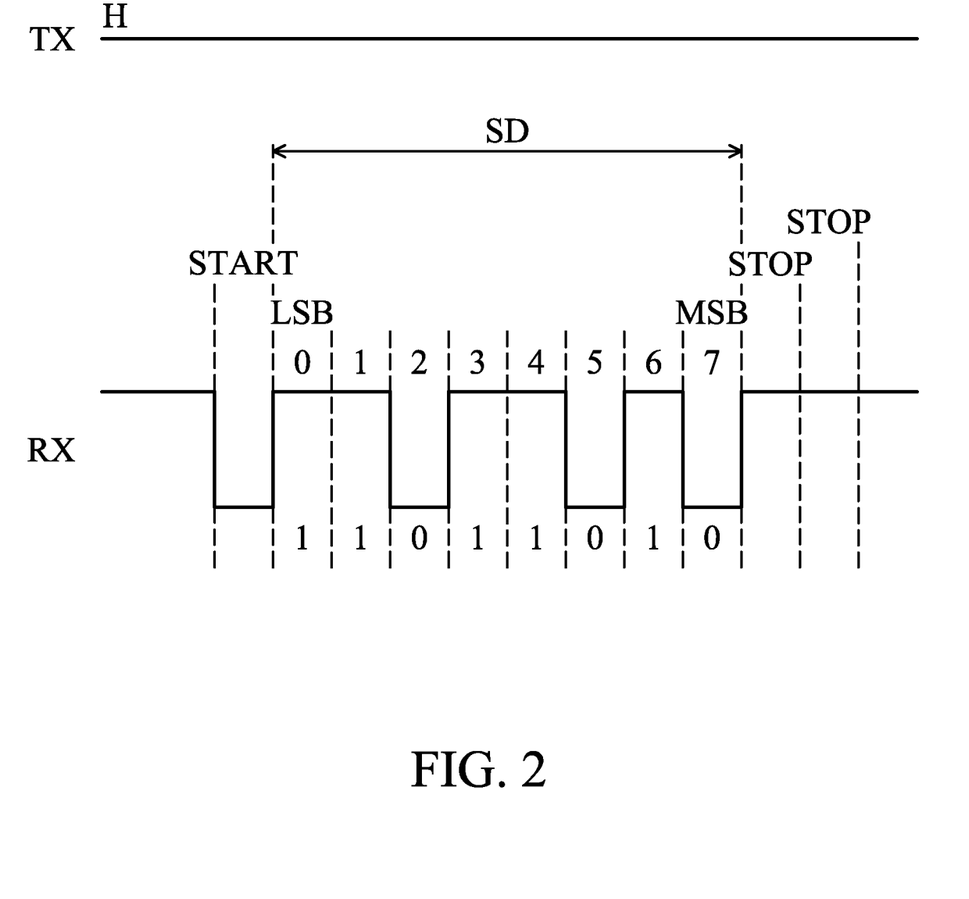
FIG. 2 is a signal diagram of UART in accordance with an embodiment of the present invention.

FIG. 2 shows a signal diagram of UART according to an embodiment of the present invention. The UART includes a transmit line TX and a receive line RX. According to an embodiment of the present invention, when the detection device 150 detects that the communication protocol between the external device 10 and the microcontroller 100 is UART, the external device 10 transmits the data signal SD through the receive line RX to the microcontroller 100, and the transmission line TX is maintained at the high logic level H.

As shown in FIG. 2, when the external device 10 transmits the data signal SD through the receive line RX, the external device 10 generates a start signal START in a low logic level prior to the receive line RX, and transmits the eight-bit data signal SD in an order from the least significant bit LSB to the most significant bit MSB. After the transmission of the data signal SD is completed, the external device 10 generates two stop signals STOP in the high logic level on the receive line RX. According to some embodiments of the present invention, the data signal SD in FIG. 2 is provided for illustration and it is not intended to be limited thereto.

Figure 3:
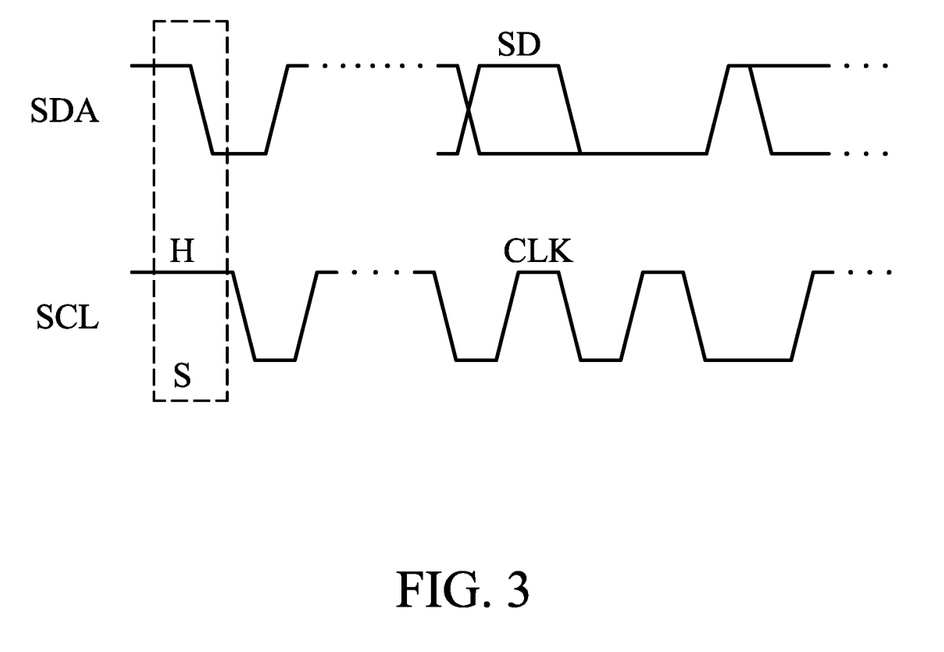
FIG. 3 is a signal diagram of I²C bus in accordance with an embodiment of the present invention.

FIG. 3 is a signal diagram of I²C bus in accordance with an embodiment of the present invention. According to an embodiment of the present invention, when the detection device 150 determines that the communication protocol between the external device 10 and the microcontroller 100 is I²C bus, the external device 10 transmits the data signal SD to the microcontroller 100 through the serial data line SDA, and transmits the clock signal CLK to the microcontroller 100 through the serial clock line SCK. In other words, when the external device 10 transmits the data signal SD to the microcontroller 100 through the serial data line SDA, the external device 10 simultaneously transmits the clock signal CLK to the microcontroller 100 through the serial clock line SCK.

As shown in FIG. 3, in the initial state S, the signal of the serial data line SDA is toggled, and the serial clock line SCK is maintained at the high logic level H. In other words, in the initial state S, the signal of the serial data line SDA is toggled before the serial clock line SCK is toggled.

Figure 4:
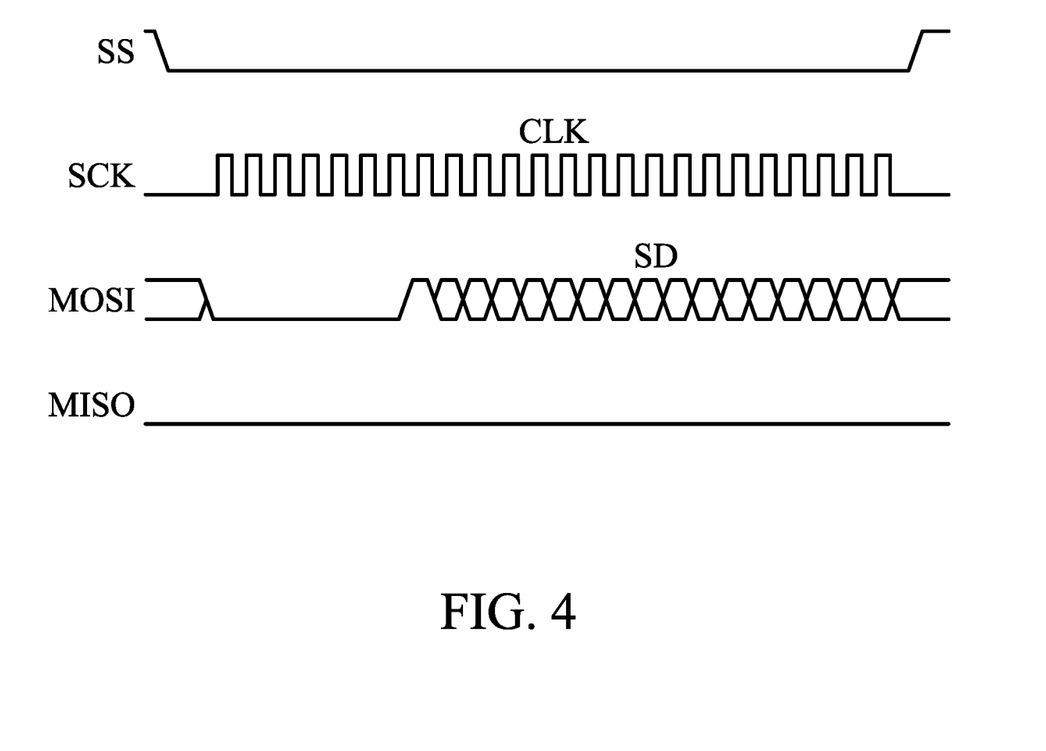
FIG. 4 is a signal diagram of serial peripheral interface in accordance with an embodiment of the present invention.

FIG. 4 is a signal diagram of serial peripheral interface in accordance with an embodiment of the present invention. According to an embodiment of the present invention, when the detection device 150 determines that the communication protocol between the external device 10 and the microcontroller 100 is SPI, the external device 10 selects the microcontroller 100 through the slave-select line SS, transmits the clock signal CLK to the microcontroller 100 through the serial clock line SCK, transmits the data signal SD to the microcontroller 100 through the master-out-slave-in line MOSI, and keeps the master-in-slave-out line MISO in the high impedance state. According to an embodiment of the present invention, as shown in FIG. 4, when the slave-select line SS is at the low logic level, the external device 10 selects the microcontroller 100 for communication.

In order for the detection device 150 to determine the communication protocol between the external device 10 and the microcontroller 100, the first pin PIN1 and the second pin PIN2 defined in UART, I²C bus, and SPI are shown in Table 1. In other words, the first pin PIN1 is defined as the transmission line TX of UART, the serial clock line SCK of I²C bus, and the slave-select line SS of SPI, and the second pin PIN2 is defined as the receive line RX of UART, the serial data line SDA of I²C bus, and the serial clock line SCK of SPI.

TABLE 1

|  | PIN1 | PIN2 |
|---|---|---|
| UART | TX | RX |
| I²C bus | SCK | SDA |
| SPI | SS | SCK |

Figure 5:
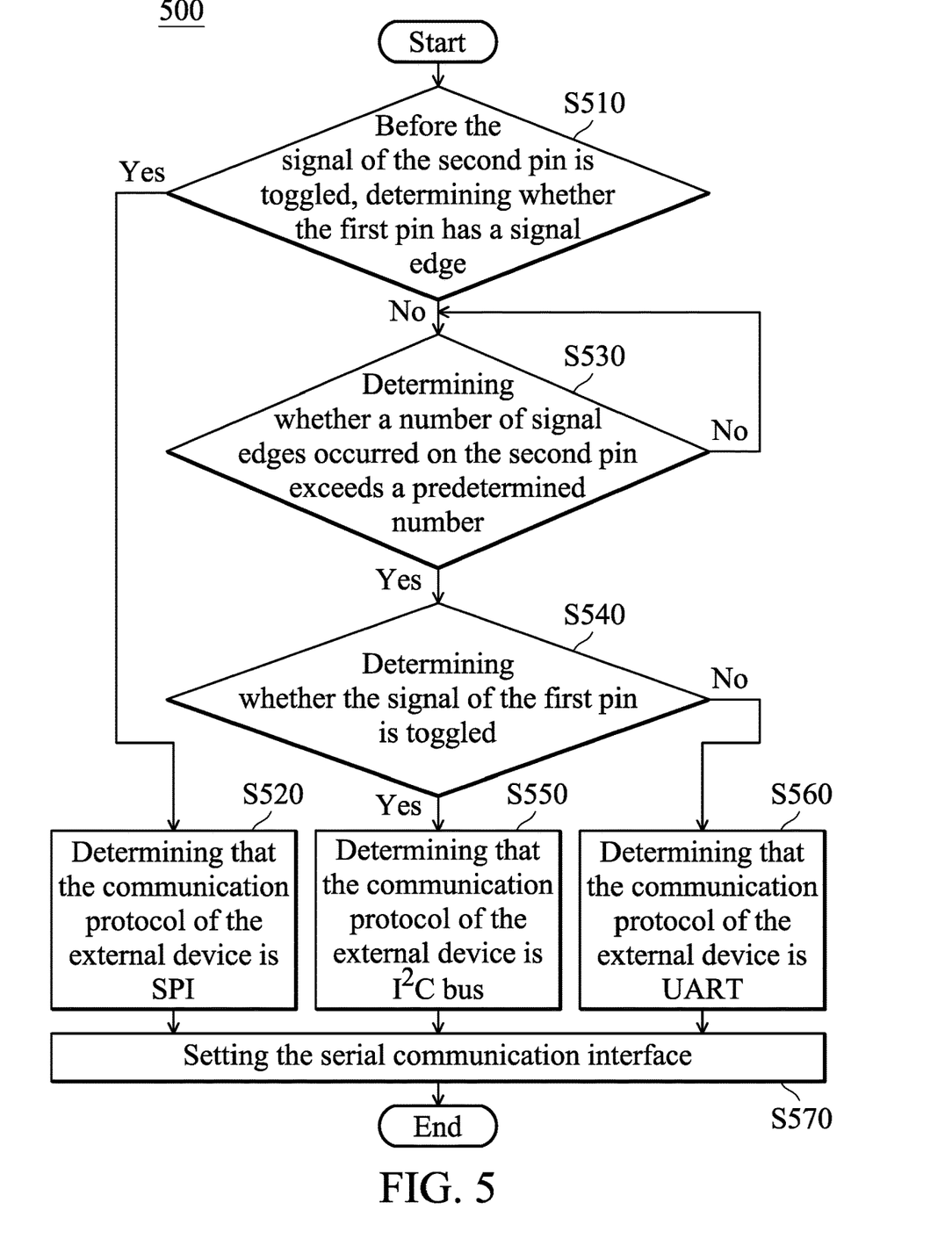
FIG. 5 is a flowchart of a detection method in accordance with an embodiment of the present invention.

FIG. 5 is a flowchart of a detection method in accordance with an embodiment of the present invention. The following description of the detection method 500 in FIG. 5 will be combined with FIG. 1 for detailed explanation.

When the detection method 500 is performed by the detection device 150 of FIG. 1, the serial communication interface 140 receives the data signal SD from the external device 10. According to an embodiment of the present invention, the data signal SD is 0x55. First, before the signal of the second pin PIN2 is toggled, the detection device 150 determines whether the first pin PIN1 has a signal edge (Step S510). When it is determined that the first pin PIN1 has a signal edge before the signal of the second pin PIN2 is toggled, it is determined that the communication protocol of the external device 10 is SPI (step S520).

As shown in FIG. 2, when the external device 10 transmits the data signal SD to the serial communication interface 140 with the communication protocol of UART, the first pin PIN1 stays in the high logic level since the first pin PIN1 is defined as the interface of the UART For the transmission line TX (as shown in Table 1). In other words, when the communication protocol is UART, the detection device 150 may not detect a signal edge on the first pin PIN1.

As shown in FIG. 3, when the external device 10 transmits the data signal SD to the serial communication interface 140 with the communication protocol of $I^2C$ bus, the signal of the serial data line SDA (corresponding to the second pin PIN2) is toggled before the serial clock line SCK (corresponding to the first pin PIN1) is toggled since the first pin PIN1 is defined as the serial clock line SCK of the $I^2C$ bus (as shown in Table 1). In other words, when the communication protocol is $I^2C$ bus, the detection device 150 may not detect a signal edge on the first pin PIN1 before the second pin PIN2 is toggled.

As shown in FIG. 4, when the external device 10 transmits the data signal SD to the serial communication interface 140 with SPI, the first pin PIN1 is defined as the slave-select line SS of SPI (as shown in Table 1), and the device selection line SS (corresponding to the first pin PIN1) is toggled from the high logic level to the low logic level before the second pin PIN2 (corresponding to the serial clock line SCK) starts to transmit the clock signal CLK. Therefore, when it is determined in step S510 that the first pin PIN1 has a signal edge before the second pin PIN2 is toggled, it indicates that the communication protocol of the external device 10 is SPI.

Returning to Step S510, when it is determined that the first pin PIN1 does not have a signal edge before the signal of the second pin PIN2 is toggled, the detection device 150 determines whether the number of signal edges on the second pin PIN2 exceeds a predetermined number (Step S530). According to an embodiment of the present invention, the data signal SD is 0x55, and the predetermined number is 4. When it is determined in Step S530 that the number of signal edges on the second pin PIN2 does not exceed the predetermined number, Step S530 is repeatedly executed. When it is determined in Step S530 that the number of signal edges on the second pin PIN2 exceeds the predetermined number, the detection device 150 determines once again whether the signal of the first pin PIN1 is toggled (Step S540).

When it is determined in Step S540 that the signal of the first pin PIN1 is toggled, the detection device 150 determines that the communication protocol of the external device 10 is $I^2C$ bus (Step S550). When it is determined in Step S540 that the signal of the first pin PIN1 has not been toggled, the detection device 150 determines that the communication protocol of the external device 10 is UART (Step S560). When the communication protocol is identified, the detection device 150 sets the serial communication interface 140 based on the communication protocol that has been determined by the detection device 150 (Step S570).

As shown in Table 1, the first pin PIN1 is defined as the transmission line TX of UART and the serial clock line SCK of $I^2C$ bus, in which SPI is excluded in Step S510. As shown in FIG. 2, when the external device 10 transmits the data signal SD, the transmission line TX of UART keeps at the high logic level H. As shown in FIG. 3, when the external device 10 transmits the data signal SD, the serial clock line SCK (the first pin PIN1) of $I^2C$ bus transmits the clock signal CLK at the same time. Therefore, when the signal edge of the second pin PIN2 exceeds a predetermined number, it may be determined that the communication protocol is UART or $I^2C$ bus according to whether the signal of the first pin PIN1 is still toggled.

Figure 6:
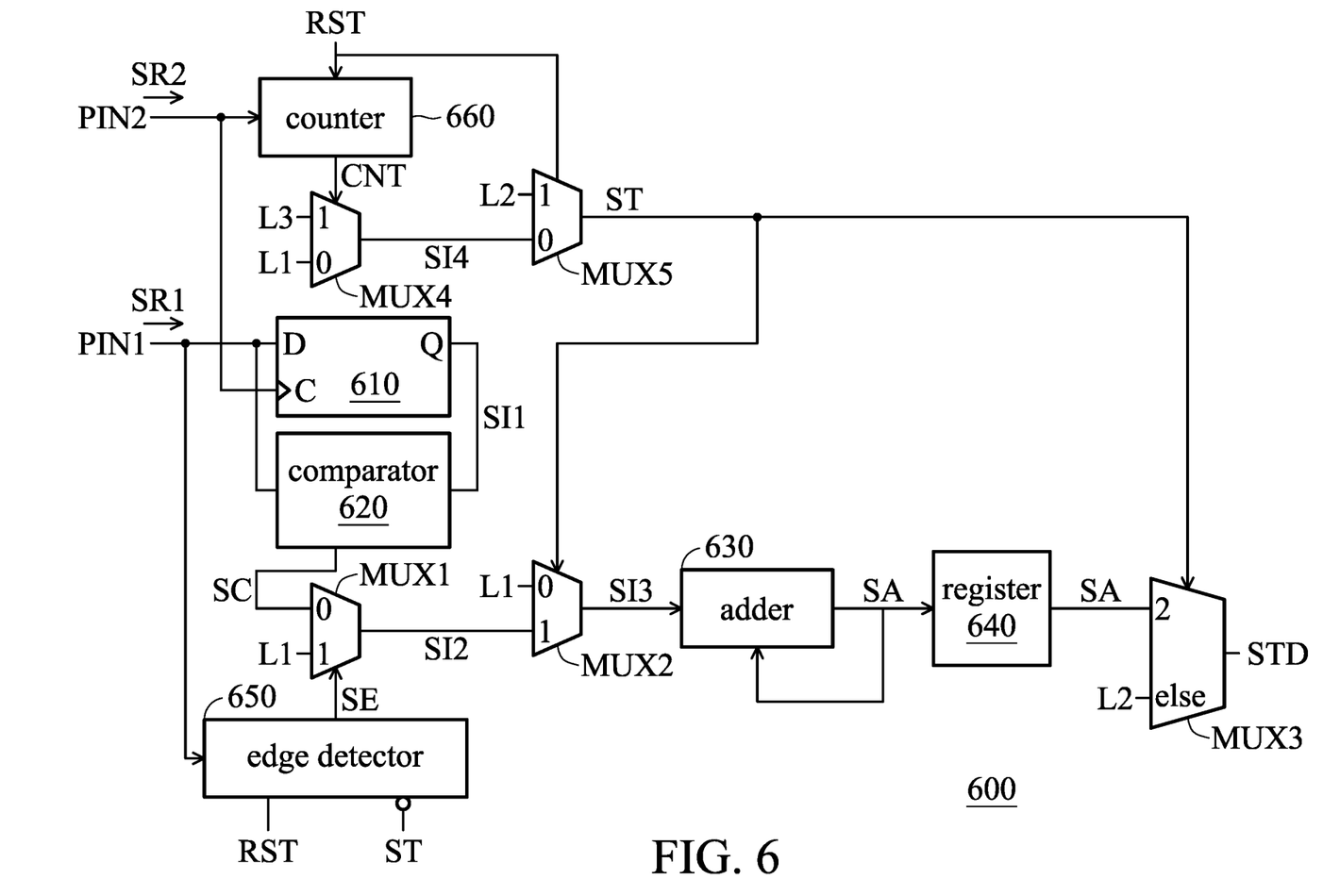
FIG. 6 is a block diagram of a detection device in accordance with an embodiment of the present invention.

FIG. 6 is a block diagram of a detection device in accordance with an embodiment of the present invention. According to an embodiment of the present invention, the detection device 600 in FIG. 6 corresponds to the detection device 150 in FIG. 1. As shown in FIG. 6, the detection device 600 includes a flip-flop 610, a comparator 620, a first multiplexer MUX1, a second multiplexer MUX2, an adder 630, a register 640 and a third multiplexer MUX3.

The flip-flop 610 includes an input terminal D, an output terminal Q, and a clock terminal C, in which the input terminal D receives the first received signal SR1 received by the first pin PIN1, the output terminal Q outputs the first internal signal SI1, and the clock terminal C receives the second received signal SR2 received by the second pin PIN2. According to an embodiment of the present invention, the flip-flop 610 temporarily stores the first received signal SR1 and outputs the first received signal SR1 as the first internal signal SI1 according to the signal edge of the second received signal SR2 received by the clock terminal C.

The comparator 620 is configured to compare whether the first received signal SR1 and the first internal signal SI1 are the same to generate a comparison signal SC. According to an embodiment of the present invention, when the first received signal SR1 and the first internal signal SI1 are the same, it indicates that the first received signal SR1 received by the first pin PIN1 is not toggled, so that the comparison signal SC outputted by the comparator 620 is logic "0". According to another embodiment of the present invention, when the first received signal SR1 and the first internal signal SI1 are different, it indicates that the first received signal SR1 received by the first pin PIN1 is toggled, so that the comparison signal SC output by the comparator 620 is logical "1".

The first multiplexer MUX1 outputs either the comparison signal SC or the first logic level L1 as the second internal signal SI2 according to the edge detection signal SE. The second multiplexer MUX2 outputs either the first logic level L1 or the second internal signal SI2 as a third internal signal SI3 according to the state signal ST. The adder 630 adds 1 to the accumulation signal SA according to the third internal signal SI3. The register 640 is configured to store the accumulated signal SA.

The third multiplexer MUX3 outputs the accumulation signal SA or the second logic level L2 as the determination signal SDT according to the state signal ST. According to an embodiment of the present invention, the serial communication interface 140 of FIG. 1 determines that the communication protocol is UART, $I^2C$ bus, or SPI based on the state of the determination signal SDT.

As shown in FIG. 6, the detection device 600 further includes an edge detector 650. The edge detector 650 is enabled by the inverse of the state signal ST and reset by the reset signal RST, where the edge detector 650 is configured to detect the signal edge of the first received signal SR1 to generate an edge detection signal SE. In other words, the edge detector 650 is configured to detect whether the first received signal SR1 is toggled to generate the edge detection signal SE. According to an embodiment of the present invention, the reset signal RST corresponds to the enable signal EN in FIG. 1.

According to an embodiment of the present invention, when the edge detector 650 detects the signal edge of the first received signal SR1, the second internal signal SI2 output by the first multiplexer MUX1 is at the first logic level L1, the third internal signal SI3 output by the second multiplexer MUX2 is at the first logic level L1, and the adder 630 adds 1 to the accumulated signal SA according to the third internal signal SI3 that is at the first logic level L1.

As shown in FIG. 6, the detection device 600 further includes a counter 660, a fourth multiplexer MUX4 and a fifth multiplexer MUX5. The counter 660 is reset by the reset signal RST, and counts the number of signal edges of the second received signal SR2 received by the second pin PIN2 to generate the count signal CNT. The fourth multiplexer MUX4 outputs either the first logic level L1 or the third logic level L3 as a fourth internal signal SI4 according to the count signal CNT. The fifth multiplexer MUX5 outputs the second logic level L2 or the fourth internal signal SI4 as the state signal ST according to the reset signal RST.

According to an embodiment of the present invention, the first logic level L1 is the logic "1", the second logic level L2 is the logic "0", and the third logic level L3 is the logic "2". The logic "2" may be regarded as a logic level that is different from the logic "1" and the logic "0". Therefore, it may also be considered that the adder 630 sums the accumulated signal SA and the first logic level L1 (i.e., logic "1") to generate a new accumulated signal SA.

Figure 7:
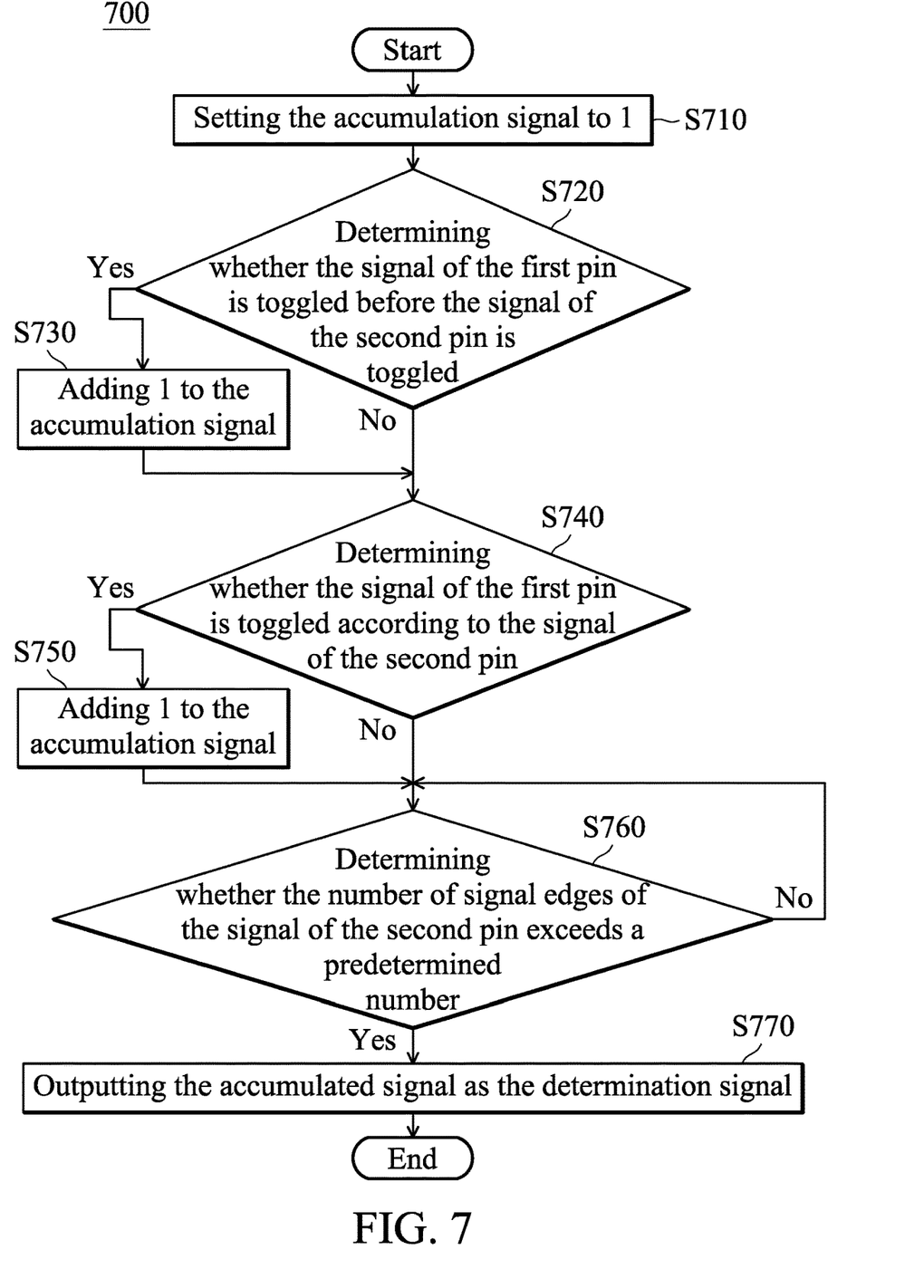
FIG. 7 is a flowchart of a detection method in accordance with another embodiment of the present invention.

FIG. 7 is a flowchart of a detection method in accordance with another embodiment of the present invention. The following description of the detection method 700 in FIG. 7 will be combined with FIG. 6 for detailed description. When the detection device 600 performs the detection method 700, the serial communication interface 140 of FIG. 1 receives the data signal SD from the external device 10 (as shown in FIGS. 2-4). According to an embodiment of the present invention, the data signal SD is 0x55.

As shown in FIG. 7, the detection device 600 sets the accumulation signal SA to 1 (Step S710). As shown in FIG. 6, when the reset signal RST is logic "1", both the edge detector 650 and the counter 660 are reset, so that the edge detection signal SE and the counting signal CNT are both logic "0". At this time, the state signal ST output by the fifth multiplexer MUX5 is at the second logic level L2 (i.e., logic "0"), and the third internal signal SI3 output by the second multiplexer MUX2 is at the first logic level L1 (i.e., logic "0").

In addition, the adder 630 adds 1 to the accumulation signal SA according to the third internal signal SI3 that is at the first logic level L1, so that the accumulation signal SA is logic "1". According to another embodiment of the present invention, the adder 630 sums the third internal signal SI3 and the accumulated signal SA, and the added accumulated signal SA is then logic "1". In other words, when the reset signal RST resets the detection device 600, the initial value of the accumulation signal SA is also set to logic "1".

Referring to FIG. 7, after step S710, the detection device 600 determines whether the signal of the first pin PIN1 is toggled before the signal of the second pin PIN2 is toggled (step S720). As shown in FIG. 6, when the reset signal RST is a logic "1", the state signal ST output by the fifth multiplexer MUX5 is a second logic level L2 (logic "0"). When the edge detector 650 is enabled due to the state signal ST being logic "0", the edge detector 650 detects whether the first receiving signal SR1 is toggled to generate the edge detection signal SE.

When the edge detector 650 detects the signal edge of the first received signal SR1, the edge detection signal SE generated by the edge detector 650 is logic "1", so that the second internal signal SI2 output by the first multiplexer MUX1 is at the first logic level L1 (logic "1"). In addition, the second multiplexer MUX2 outputs the second internal signal SI2 as the third internal signal SI3 according to the state signal ST that is logic "1", so that the adder 630 adds 1 to the accumulation signal SA (Step S730). Therefore, in Step S710, the detection device 600 sets the initial value of the accumulation signal SA to 1.

Referring to FIG. 7, when Step S720 is determined to be NO or Step S730 ends, the detection device 600 determines whether the first received signal SR1 received by the first pin PIN1 is toggled according to the second received signal SR2 received by the second pin PIN2 (Step S740). When it is determined whether the first received signal SR1 received by the first pin PIN1 is toggled, the detection device 600 adds 1 to the accumulated signal (Step S750).

As shown in FIG. 6, when the second pin PIN2 receives the second received signal SR2, the reset signal RST returns to logic "0", and the flip-flop 610 outputs the first received signal SR1 as the first internal signal SI1 according to the signal edge of the second receive signal SR2. In addition, when the first received signal SR1 and the first internal signal SI1 are the same, it indicates that the first received signal SR1 received by the first pin PIN1 is not toggled. According to an embodiment of the present invention, when the reset signal RST is logic "0", the state signal ST is logic "1", the edge detection signal SE output by the edge detector 650 is logic "0", and the first multiplexer MUX1 outputs the comparison signal SC as the second internal signal SI2.

According to an embodiment of the present invention, when the first received signal SR1 and the first internal signal SI1 are the same, the comparison signal SC output by the comparator 620 is a logic "0", and the first multiplexer MUX1 and the second multiplexer MUX2 provide the comparison signal SC that is logic "0" to the adder 630, so that the accumulated signal SA remains unchanged. According to another embodiment of the present invention, when the first received signal SR1 and the first internal signal SI1 are different, the comparison signal SC output by the comparator 620 is logic "1", the first multiplexer MUX1 and the second multiplexer MUX2 provide the comparison signal SC that is logic "1" to the adder 630, so that the accumulation signal SA is incremented by 1.

Referring to FIG. 7, when Step S740 is determined to be NO or Step S750 ends, the detection device 600 further determines whether the number of signal edges of the second received signal SR2 received by the second pin PIN2 exceeds a predetermined number (Step S760). When it is determined that the number of signal edges of the second received signal SR2 exceeds the predetermined number, the detection device 600 outputs the accumulated signal SA as the determination signal SDT (Step S770). When it is determined that the number of signal edges of the second received signal SR2 does not exceed the predetermined number, the detection device 600 repeatedly executes step S760.

As shown in FIG. 6, the counter 660 is configured to count the number of signal edges of the second receive signal SR2 received by the second pin PIN2. When the number of signal edges of the second received signal SR2 is not less than the predetermined number, the count signal CNT is logic "1", so that the fourth multiplexer MUX4 outputs the third logic level L3 (i.e., logic "2") as the fourth internal signal SI4 according to the count signal CNT that is logic "1", and the fifth multiplexer MUX5 also outputs the fourth internal signal SI4 that is the third logic level L3 (i.e., logic "2") as the state signal ST. The third multiplexer MUX3 outputs the accumulation signal SA as the determination signal SDT according to the state signal ST that is logic "2". According to an embodiment of the present invention, the predetermined number is 4. According to some embodiments of the present invention, the predetermined number may be varied with the data signal SD.

Next, the serial communication interface 140 of FIG. 1 determines that the communication protocol of the external device 10 is UART, I²C bus, or SPI according to the determination signal SDT. The correspondence between the communication protocol and the value of the determination signal SDT is shown in Table 2.

TABLE 2

| determination signal SDT | Communication Protocol |
|---|---|
| 0 | the detection method uncompleted |
| 1 | UART |
| 2 | I²C Bus |
| >2 | SPI |

According to an embodiment of the present invention, since the initial value of the accumulation signal SA is 1, and the first pin PIN1 coupled to the transmission line TX is maintained at a high logic level H when the communication protocol is a UART (as shown in FIG. 2). When the determination signal SD is 1, it indicates that the accumulated signal SA has not been toggled during the execution of the detection method 700, so the serial communication interface 140 determines that the communication protocol is UART according to the determination signal SDT equal to 1.

According to another embodiment of the present invention, when the communication protocol is SPI, the first pin PIN1 is defined as the slave-select line SS. As shown in FIG. 4, the slave-select line SS is toggled before the serial clock line SCK begins transmitting the clock signal CLK, and remains unchanged since then. As described above, when the communication protocol is SPI, the accumulated signal SA is incremented by 1 in Step S730, and the initial value of the accumulated signal SA is 1. Therefore, the serial communication interface 140 determines that the communication protocol is the SPI based on the determination signal SDT equal to 2.

According to another embodiment of the present invention, when the communication protocol is I²C bus, since the first pin PIN1 is defined as the serial clock line SCK (as shown in FIG. 3), the accumulated signal SA is continuously incremented by 1 in Step S750 until the state signal ST is at the third logic level L3. Therefore, the serial communication interface 140 determines that the communication protocol is I²C bus based on the determination signal SDT exceeding 2. According to another embodiment of the present invention, when the determination signal SDT is 0, it indicates that the detection method 700 has not been completed.

The present invention provides a detection device and a detection method for identifying the communication protocol of an external device. When a microcontroller can support UART, I²C bus, and SPI at the same time, the detection device and the detection method proposed in the present invention may determine which one of UART, I²C bus, and SPI is the communication protocol being used by the external device. The serial communication interface adjusts the settings with the original update process based on the communication protocol, so that the same program may be utilized to eliminate the need to update a program corresponding to different communication protocols so as to reduce the possibility that the program in the LDROM does not match the serial communication interface.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A detection method adapted to a serial communication interface to identifying a communication protocol between the serial communication interface and an external device, wherein the communication protocol comprises UART, I²C bus, and SPI, wherein the serial communication interface comprises a first pin and a second pin, a transmission line of UART, a serial clock line of I²C bus, and a slave-select line of SPI share the first pin, and a receive line of UART, a serial data line of I²C bus, and a clock line of SPI share the second pin, wherein the detection method comprises:
   determining, by a detection device, whether the communication protocol is either one of UART, I²C bus, and SPI based on a pattern of signal edges of the first pin and the second pin from the external device;
   wherein the detection device is electrically connected to the first pin and the second pin.

2. The detection method as defined in claim 1, wherein the step of determining, by a detection device, whether the communication protocol is UART, I²C bus, or SPI based on the signal edge of the first pin and the second pin further comprises:
   before a signal of the second pin is toggled, determining, by the detection device, whether the first pin has the signal edge; and
   when it is determined that the first pin has the signal edge, determining, by the detection device, that the communication protocol is SPI.

3. The detection method as defined in claim 2, wherein the step of determining, by a detection device, whether the communication protocol is UART, I²C bus, or SPI based on the signal edge of the first pin and the second pin further comprises:
   when it is determined that the first pin does not have the signal edge, counting a number of signal edges of the second pin by the detection device;
   when the number exceeds a predetermined number, determining, by the detection device, whether a signal of the first pin is toggled; and when it is determined that the signal of the first pin is toggled, determining, by the detection device, that the communication protocol is I²C bus.

4. The detection method as defined in claim 3, wherein the step of determining, by a detection device, whether the communication protocol is UART, I²C bus, or SPI based on the signal edge of the first pin and the second pin further comprises:
when the number exceeds the predetermined number and it is determined that the signal of the first pin is not toggled, determining, by the detection device, that the communication protocol is UART.

5. The detection method as defined in claim 3, wherein the serial communication interface receives a data signal from the external device through the first pin and/or the second pin, wherein the data signal is 0x55.

6. The detection method as defined in claim 5, wherein the predetermined number is 4.

7. The detection method as defined in claim 1, further comprising:
when the communication protocol is determined to be either one of UART, I²C bus, and SPI, setting the serial communication interface based on the communication protocol that has been identified.

* * * * *